United States Patent [19]

Ueki et al.

[11] Patent Number: 4,903,549
[45] Date of Patent: Feb. 27, 1990

[54] SHIFT CONTROL SYSTEM FOR AUTOMATIC TRANSMISSION

[75] Inventors: Akihiro Ueki, Zama; Kazuhiko Sugano, Yokohama, both of Japan

[73] Assignee: Nissan Motor Co., Ltd., Yokohama, Japan

[21] Appl. No.: 264,730

[22] Filed: Oct. 31, 1988

[30] Foreign Application Priority Data

Oct. 30, 1987 [JP] Japan .............................. 62-273225

[51] Int. Cl.$^4$ ............................................. B60K 41/10
[52] U.S. Cl. ...................................... 74/867; 475/129
[58] Field of Search ............. 74/867, 868, 869, 752 C, 74/752 A

[56] References Cited

U.S. PATENT DOCUMENTS 4,413,536 11/1983 Whitney et al. ................... 74/868 X
4,730,521 3/1988 Hayasaki et al. ................. 74/868 X
4,776,240 10/1988 Miki ................................. 74/867 X Primary Examiner—Rodney H. Bonck
Assistant Examiner—Harold F. Macris
Attorney, Agent, or Firm—Foley & Lardner, Schwartz, Jeffrey, Schwaab, Mack, Blumenthal & Evans

[57] ABSTRACT

A hydraulic control system for an automatic transmission comprises a one-way valve arranged between a hydraulic line leading to a second speed apply chamber of a band brake and a hydraulic line leading to a fourth speed apply chamber of the band brake in such a manner as to allow fluid communication between them when a pressure dfferential takes place. The pressure differential takes place when the transmission upshifts from the first speed ratio to fourth speed ratio. Thus, during the 1-4 shift, a pressure build-up in the fourth speed apply chamber takes place in the same manner as a pressure build-up taking place in the second speed apply chamber under the control of a 1-2 accumulator valve.

2 Claims, 5 Drawing Sheets

FIG. 3

| | | R/C | H/C | F/C | O/C | B/B 2A | B/B 3R | B/B 4A | L&R/B | F/O | L/O | GEAR RATIO | α1 = 0.45<br>α2 = 0.45 |
|---|---|---|---|---|---|---|---|---|---|---|---|---|---|
| D RANGE | ENGINE DRIVING 1ST | | | ○ | | | | | | ○ | ○ | $\dfrac{1+\alpha_1}{\alpha_1}$ | 3.22 |
| | ENGINE DRIVING 2ND | | | ○ | | ○ | | | | ○ | | $\dfrac{\alpha_1+\alpha_2+\alpha_1\alpha_2}{\alpha_1(1+\alpha_2)}$ | 1.69 |
| | ENGINE DRIVING 3RD | | ○ | ○ | | | | | | ○ | | 1 | 1 |
| | ENGINE DRIVING 4TH | | ○ | (○) | | | | ○ | | | | $\dfrac{1}{1+\alpha_2}$ | 0.69 |
| | ENGINE BRAKING 1ST | | | (○) | ○ | ○ | ○ | | | | | | |
| | ENGINE BRAKING 2ND | | | (○) | ○ | ○ | | | | | | | |
| | ENGINE BRAKING 3RD | | ○ | (○) | ○ | | | | | | | | |
| | ENGINE BRAKING 4TH | | ○ | (○) | | | | ○ | | | | | |
| 2 ND RANGE | 1ST | | | ○ | | | | | | ○ | ○ | | |
| | 2ND | | | ○ | | ○ | | | | ○ | | | |
| 1 ST RANGE | 1ST | | | ○ | | | | | ○ | ○ | | | |
| REVERSE | | ○ | | | | | | | ○ | | | $-\dfrac{1}{\alpha_2}$ | −2.22 |

( ) UNRELATED TO POWER TRANSMISSION

SHIFT CONTROL SYSTEM FOR AUTOMATIC TRANSMISSION

BACKGROUND OF THE INVENTION

The present invention relates to a shift control system for an automatic transmission, and more particularly to a hydraulic system for alleviating shocks taking place during a shift involving activation of dual pistons of a servomotor of a friction device.

JP 62-62047 discloses a shift control system for an automatic transmission. This automatic transmission is shiftable between any two of four forward speed ratios, and it includes a band brake with a servomotor having dual pistons. This band brake is applied during operation with the second speed ratio and during operation with the fourth speed ratio. The servomotor of this band brake, therefore, has two apply chambers which the dual pistons are exposed to, and a release chamber. One of the two apply chambers is adapted to be supplied with hydraulic pressure during a shift to the second speed ratio, and thus it is hereinafter called as a second speed apply chamber. The other apply chamber, on the other hand, is adapted to be supplied with hydraulic pressure during a shift to the fourth speed ratio, and thus it is hereinafter called a four speed apply chamber. The band brake is applied during operation with each of the second and fourth speed ratios. The release chamber is adapted to be supplied with hydraulic pressure during a shift to the third speed ratio, causing the band brake to be released. There is provided an accumulator in communication with a hydraulic line leading from a 1-2 shift valve to the second speed apply chamber to induce a gradual rise in hydraulic pressure building up in the second speed apply chamber during a 1-2 upshift. Similarly, another accumulator is provided in communication with a hydraulic line leading from a 3-4 shift valve to the fourth speed apply chamber to induce a gradual rise in hydraulic pressure building up in the fourth speed apply chamber during a 3-4 upshift.

However, the above-mentioned known shift control system poses a problem that the capacity of the band brake increases excessively although momentarily during a 1-4 upshift. The 1-4 upshift is initiated by simultaneous supply of hydraulic fluid to the second speed apply chamber, third speed release chamber, and the fourth speed apply chamber. The hydraulic pressure build-up in the third speed release chamber, however, is slow, as compared to the hydraulic pressure build-up in each of the second and fourth speed apply chambers. Thus, the torque capacity of the band brake increases momentarily to an excessively high value that is determined by the hydraulic pressures acting in the second and fourth speed apply chambers. This induces a great shock. The reason why the hydraulic pressure build-up in the third speed release chamber is slow is that the hydraulic fluid supplied to the third speed release chamber is also supplied to a high clutch and thus there is a delay until the hydraulic pressure in the third speed release chamber increases sufficiently. This excessive increase in the torque capacity taking place momentarily during the 1-4 upshift may be avoided if the setting pressure of the accumulator provided in communication with the hydraulic line leading to the fourth speed apply chamber is made sufficiently low. However, this approach to solve the above-mentioned problem impairs quality of a 3-4 shift because the hydraulic pressure build-up in the fourth speed apply chamber becomes slow during the 3-4 shift owing to the accumulator, resulting in an increase in the length of time for the 3-4 upshift, inducing engine racing.

An object of the present invention is to improve a hydraulic control system of the above-mentioned type such that the above-mentioned problem is solved without any major change in the existing component parts of the system.

SUMMARY OF THE INVENTION

Briefly, according to the present invention, the above-mentioned problem has been solved by providing a one-way flow valve between the fourth speed apply chamber and the second speed apply chamber in such a manner as to allow a flow of hydraulic fluid from the fourth speed chamber to the second speed chamber, only, and prevent the opposite flow from the second speed apply chamber to the fourth speed apply chamber.

In accordance with the present invention, there is provided a hydraulic control system for an automatic transmission including a friction device which is engaged in response to at least one of a hydraulic pressure build-up in a low speed apply chamber and a hydraulic pressure build-up in a high speed apply chamber, the automatic transmission being shiftable to one speed ratio where hydraulic fluid is discharged from both of the low and high speed apply chambers, shiftable to another speed ratio where hydraulic fluid is supplied to the low speed apply chamber, while hydraulic fluid is discharged from the high speed apply chamber, and shiftable to still another speed ratio where hydraulic fluid is supplied to both of the low and high speed apply chambers, the hydraulic control system comprising:

means for allowing the hydraulic pressure build-up in the low speed apply chamber at a controlled gradual rate when the transmission shifts to the another speed ratio; and one-way valve means for allowing one-way flow of hydraulic fluid from the high speed apply chamber to the low speed apply chamber, whereby when the transmission shifts from the one speed ratio to the still another speed ratio, the hydraulic pressure build-up in the high speed apply chamber is controlled by said means for allowing the hydraulic pressure build-up.

BRIEF DESCRIPTION OF THE DRAWINGS

FIG. 3 is a table showing a shift schedule of the automatic transmission;

DETAILED DESCRIPTION OF THE INVENTION

Figure 2:
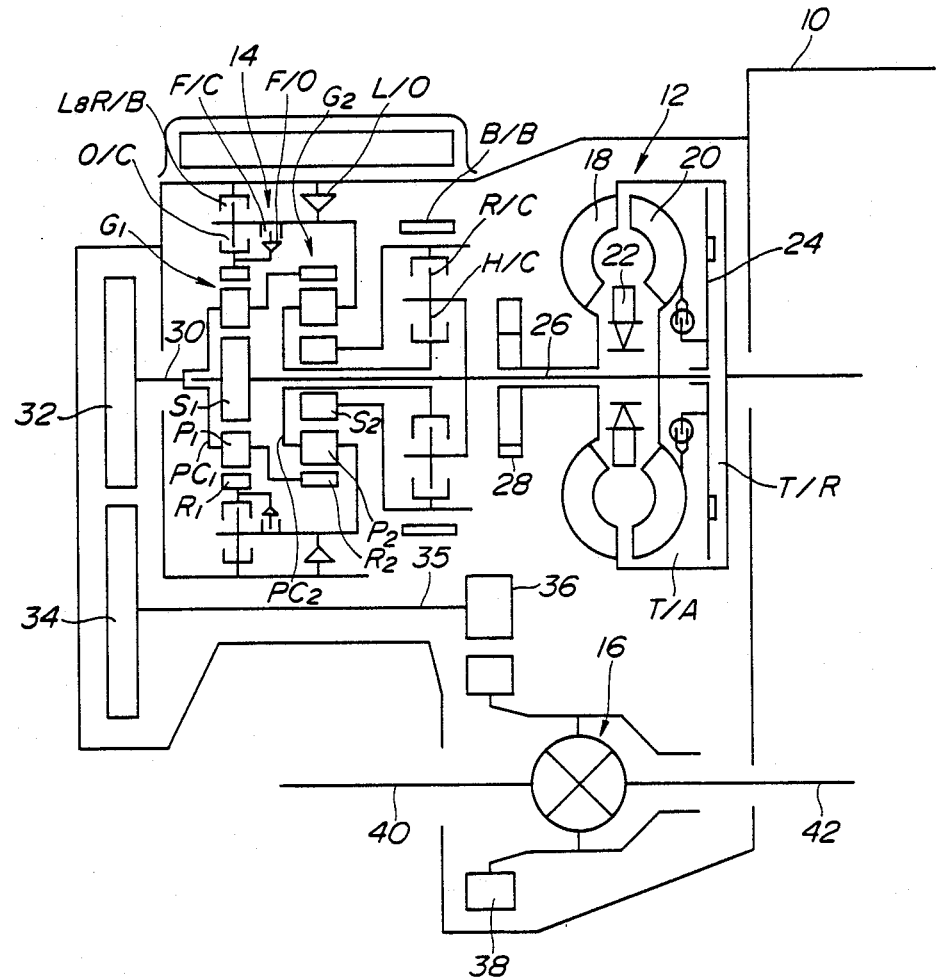
FIG. 2 is a diagram line of a power train of a transaxle including the automatic transmission.

Referring to FIG. 2, there is shown a diagram line of an automatic transmission (automatic transaxle). That is, the reference numeral 10 designates an engine which is suitable for transverse mount with regard to the longitudinal direction of a vehicle. Torque of the engine is supplied to a torque converter 12 on a pump impeller 18 thereof. In addition to the torque converter 12, the automatic transmission compirses a change speed planetary gear box 14, and a differential unit 16. In addition to the pump impeller 18, the torque converter 12 includes a turbine runner 20 and a stator 22. It also includes a lock-up clutch 24 for establishing a mechanical drive connection between the pump impeller 18 and turnine runner 20. When the lock-up clutch 24 is disengaged or released, torque is transmitted via hydraulic fluid from the pump impeller 18 to the turbine runner 20 and then to a transmission input shaft 26 drivingly connected to the turbine runner 20. When the lock-up clutch 24 is engaged, the torque is transmitted via a mechanical connection between the pump impeller 18 and turbine runner 20 to the input shaft 26. The lock-up clutch 24 is activated in response to a pressure differential between an apply chamber T/A and a release chamber T/R. The pump impeller 18 is drivingly connected to an oil pump 28 so that the engine drives the oil pump 28.

The change speed planetary gear box 14 comprises a first planetary gear set $G_1$ and a second planetary gear set $G_2$. The first planetary gear set $G_1$ includes a first sun gear $S_1$, a first internal or ring gear $R_1$, and a first planet pinion carrier $PC_1$. The first planet pinion carrier $PC_1$ rotatably supports at least one planet pinion $P_1$ meshing with the sun and ring gears $S_1$ and $R_1$. The second planetary gear set $G_2$ comprises a second sun gear $S_2$, a second internal or ring gear $R_2$, and a second planet pinion carrier $PC_2$. The second planet pinion carrier $PC_2$ rotatably supports at least one planet pinion $P_2$ meshing with the second sun and ring gears $S_2$ and $R_2$. The first sun gear $S_1$ is drivingly connected to the input shaft 26, while the first pinion carrier $PC_1$ and second ring gear $R_2$ are drivingly connected to a transmission output shaft 30.

Via a serially connected forward one-way clutch F/O and forward clutch F/C, the first ring gear $R_1$ is drivingly connectable to the second pinion carrier $PC_2$. An overrun clutch O/C is arranged in parallel to the serially connected forward one-way clutch F/O and forward clutch F/C. Via this overrun clutch O/C, the first ring gear $R_1$ is drivingly connectable to the second pinion carrier $PC_2$. The second sun gear $S_2$ is drivingly connectable via a reverse clutch R/C to the input shaft 26. The second pinion carrier $PC_2$ is dirivingly connectable via a high clutch H/C to the input shaft 26. The second sun gear $S_2$ is adapted to be held stationary relative to a transmission casing via a band brake B/B. The second pinion carrier $PC_2$ is adapted to be held stationary relative to the casing via a low one-way clutch L/O or a low & reverse brake L&R/B which is arranged in parallel to the low one-way clutch L/O. The output shaft 30 has an output gear 32 rotatable therewith. An idler shaft 35 is rotatably mounted in the transmission casing and extends in parallel to the output shaft 30. An idler gear 34 is connected to the idler shaft 35 for rotation therewith at one end portion thereof. At the opposite end portion, the idler shaft 35 has a reduction gear 36 for rotation therewith. The idler gear 34 is in mesh with the output gear 32, while the reduction gear 36 in mesh with a ring gear 38 of the differential unit 16. The differential unit 16 has drive axles 40 and 42 extending outward in the opposite directions. These drive axles 40 and 42 are drivingly connected to a left front wheel and a right front wheel, respectively.

In the change speed planetary gear box 14, varying a selected one or a selected combination of the clutches F/C, H/C, O/C, and R/C, the brakes B/B and L&R/B, and the one-way clutches F/O and L/O which are to be activated or engaged will cause a shift in rotating state of planetary gear elements $S_1$, $S_2$, $R_1$, $R_2$, $PC_1$, and $PC_2$ of the planetary gear sets $G_1$ and $G_2$, causing a change in the rotational speed of the output shaft 30 relative to the rotational speed of the input shaft 26. More specifically, activating one of or a combination of the clutches, brakes, and one-way clutches in a schedule as illustrated in the TABLE in FIG. 3 will cause a shift between four forward speed ratios in various modes and a reverse speed ratio. In FIG. 3, the sign o indicates that a particular frictional device is activated or engaged. If the particular friction device is a clutch or a brake, the above-mentioned sign o indicates the engagement of the clutch or brake, while if the particular friction device is a one-way clutch, the sign o indicates activation of the one-way clutch. The reference numerals 2A, 3R, and 4A arranged in a row below the reference numeral B/B indicate a second speed apply chamber 2A, a third speed release chamber 3R and a fourth speed apply chamber 4A of a hydraulic pressure operated servomotor for tightening the band brake B/B. The reference sign o indicates supply of hydraulic fluid pressure to a particular chamber. The reference characters $\alpha_1$ (alpha one) and $\alpha_2$ (alpha two) express a ratio of number of teeth of the sun gear $S_1$ to number of teeth of the ring gear $R_1$, and a ratio of number of teeth of the sun gear $S_2$ to number of teeth of the ring gear $R_2$, respectively. A gear ratio is a ratio of rotational speed of the input shaft 26 to rotational speed of the output shaft 30.

Owing to the change speed operation by the planetary gear box 14, rotating the input shaft 26 at a rotational speed causes the output shaft 30 to rotate at a rotational speed decreased or increased from the rotational speed of the input shaft 26. Torque of the output shaft 30 is transmitted via an output gear 32, idler gear 34, reduction gear 36 to the ring gear 38 of the differential unit 16. This causes the drive axles 40 and 42 to drive the left and right front wheels 40 and 42. As a result, an automatic shift among four forward speed ratios including an overdrive can be effected.

Figure 4:
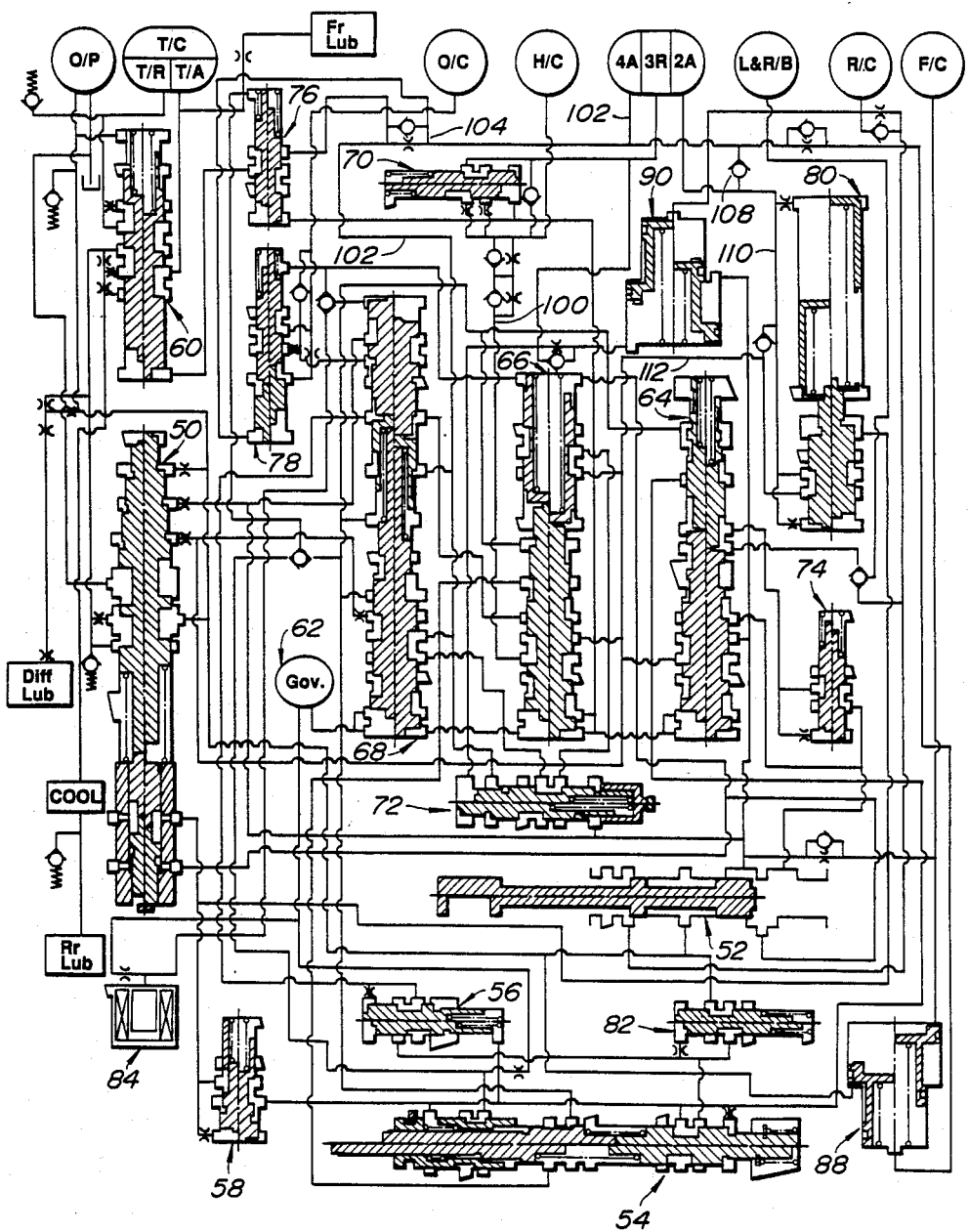
FIG. 4 is a hydraulic circuit of the hydraulic control system for the automatic transmission.

FIG. 4 shows a hydraulic circuit of a hydraulic control system for controlling the above-mentioned power train.

This hydraulic control system comprises the following valves: a pressure regulator valve 50, a manual valve 52, a throttle valve 54, a throttle modifier valve 56, a pressure modifier valve 58, a lock-up control valve 60, a governor valve 62, a 1-2 shift valve 64, a 2-3 shift valve 66, a 3-4 shift valve 68, a 3-2 timing valve 70, a 4-2 sequence valve 72, a manual first range pressure reduction valve 74, a vehicle speed cutoff valve 76, an overrun clutch control valve 78, a 1-2 accumulator valve 80, a kickdown modifier valve 82, an overdrive inhibitor solenoid 84, a N-D accumulator 88, and a servo release accumulator 90. These valve are operatively interconnected as illustrated in FIG. 4. They are connected also to an oil pump O/P, the apply chamber T/A and the release chamber T/R of the torque converter 12, the clutches R/C. H/C, O/C, and F/C, the brake L&R/B, and three chambers 2A, 3R, and 4A of the band brake B/B as illustrated in FIG. 4. Owing to this circuit structure, the appropriate one or the appropriate combination of the clutches R/C, H/C, O/C, and F/C, and the brakes L&R/B and B/B which are to be engaged is selected in response to vehicle speed and opening degree of the engine throttle. In this disclosure, such valves which are not directly concerned with the present invention are not specifically described. The following explanation proceeds along FIG. 1 which illustrates such valves and portions, extracted from the whole system, which have close connection with the present invention in order to make it easy to understand the present invention.

Figure 1:
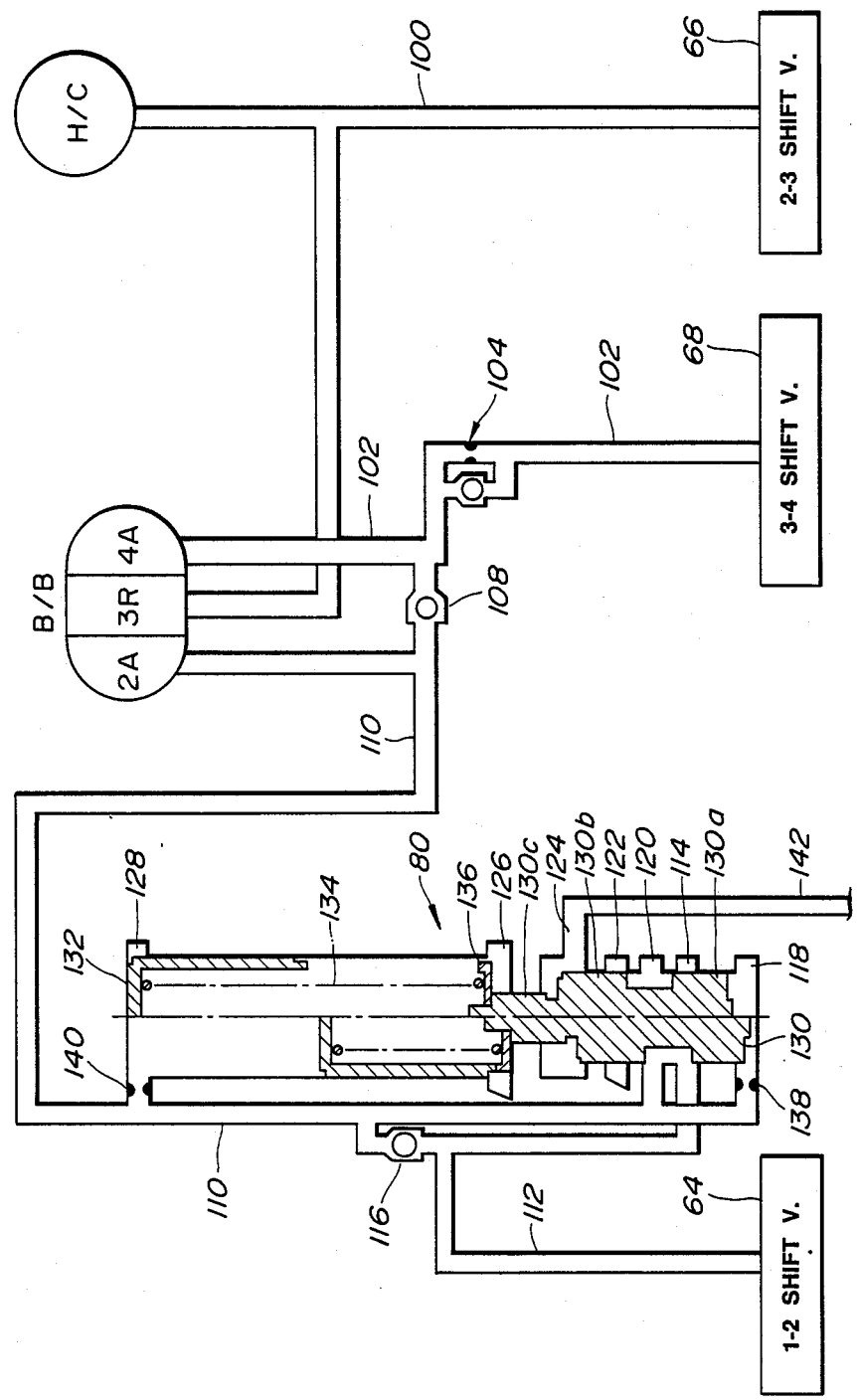
FIG. 1 is a hydraulic circuit diagram of a portion of a hydraulic control system for an automatic transmission showing a preferred embodiment according to the present invention.

Referring to FIGS. 1 and 4, FIG. 1 diagrammatically illustrates a circuit interconnecting the 2-3 shift valve 66 and those portions, such as the third speed release chamber 3R of the band brake B/B and the high clutch H/C, which are to be pressurized during operation with the third speed ratio by a simple hydraulic line 100 for ease of illustration and explanation. Actually, this circuit includes hydraulic fluid regulating or controlling devices as will be readily understood from FIG. 4. A circuit interconnecting the 3-4 shift valve 68 and the fourth speed apply chamber 4A of the band brake B/B is illustrated by a hydraulic line 102 in FIG. 1. As will be understood from FIG. 4, this circuit includes the accumulator 88 having its variable volume chamber communicating with fourth speed apply chamber 4A of the band brake B/B although this accumulator 88 is not shown in FIG. 1 for ease of explanation. A circuit interconnecting the 1-2 shift valve 64 and the second speed apply chamber 2A of the band brake B/B is illustrated as it is in FIG. 1.

Referring particularly to FIG. 1, the hydraulic line 100 which is to be supplied with hydraulic fluid when the 2-3 shift valve 66 upshifts to a third speed ratio position is connected to the third speed release chamber 3R of the band brake B/B and also to the high clutch H/C. The hydraulic line 102 which is to be supplied with hydraulic fluid when the 3-4 shift valve 68 upshifts to a fourth speed ratio position is connected to the fourth speed apply chamber 4A of the band brake B/B. A one-way flow restrictor 104 is provided in the hydraulic line 102 to divide same into a first section on one side thereof near the four speed apply chamber 4A and a second section on the opposite side thereof. The one-way flow restrictor 104 provides a restricted fluid flow when the hydraulic fluid passes therethrough from the second section of the hydraulic line 102 to the first section thereof, but provides an unrestricted fluid flow when the hydraulic fluid passes therethrough from the first section of the hydraulic line 102 to the second section thereof. The second speed apply chamber 2A of the band brake B/B is supplied with hydraulic fluid when the 1-2 shift valve 64 upshifts to a second speed ratio position via a hydraulic line 112, the 1-2 accumulator 80, and a hydraulic line 110. The hydraulic line 112 is immediately pressurized after the 1-2 shift valve 64 has upshifted to the second speed ratio position, while the hydraulic line 110 is gradually pressurized owing to the action of the 1-2 accumulator 80. However, when the 1-2 shift valve 64 downshifts to a first speed ratio position, the hydraulic fluid is immediately discharged from the second speed apply chamber 2A via a one-way valve 116 fluidly disposed between the hydraulic lines 110 and 112 in such a manner as to bypass the 1-2 accumulator 80. There is provided a one-way valve 108 between the first section of the hydraulic line 102 and the hydraulic line 110. This one-way valve 108 allows a flow of hydraulic fluid from the first section of the hydraulic line 102 to the hydraulic line 110, but it prevents the opposite flow.

The 1-2 accumulator valve 80 is formed with a valve bore provided with various ports 118, 114, 120, 122, 124, 126, and 128, and includes a spool 130 slidably inserted into the valve bore, and an accumulator piston 132. Arranged between the spool 130 and the accumulator piston 132 is a spring 134. One end of the spring 134 bears against a retainer 136 abutting with the spool 130 so that the force of the spring 134 is transmitted to the spool 130. The spool 130 has lands 130a and 130b having the same diameter, and a land 130c of a reduced diameter. The relationship between the ports and lands is set as illustrated in FIG. 1. The ports 118, 120, and 128 are connected to the hydraulic line 110. The ports 118 and 128 are provided with orifices 138 and 140, respectively. The ports 122 and 126 are drain ports, respectively. The port 124 is connected to a hydraulic line 142 which is supplied with a pressure modifier pressure that is variable in response to a throttle pressure.

The operation of this embodiment is described.

Figure 5:
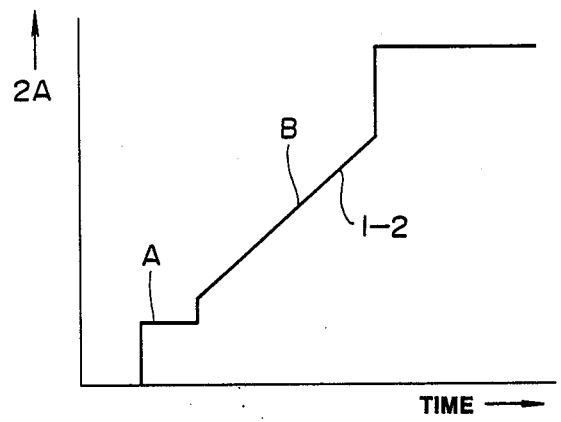
FIGS. 5 and 6 are time charts of variations of hydraulic pressures at two apply chambers 2A and 4A.

The second speed apply chamber 2A, the third speed release chamber 3R, and the fourth speed apply chamber 4A are supplied with hydraulic pressure in accordance with the schedule as shown in FIG. 3. During operation with the first speed ratio, there is no supply of hydraulic fluid to the second speed apply chamber 2A, the third speed release chamber 3R, and the fourth speed apply chamber 4A. When the 1-2 shift valve 64 upshifts from the first speed ratio position to the second speed ratio position, the supply of hydraulic fluid to the hydraulic line 112 begins. The hydraulic fluid is supplied immediately to the port 114 via the hydraulic line 112. The hydraulic fluid is supplied via the port 120 and the orifice 138 to the port 118, inducing a pressure build-up urging the spool 130 to take a position as indicated by the right half thereof as viewed in FIG. 1 against the bias of the spring 134. The spool 130 effects a pressure regulation such that a portion of the hydraulic fluid flowing into the port 120 is discharged until the hydraulic pressure at the port 120 balances the force of the spring 134. At the initial stage of this pressure regulation, the accumulator piston 132 takes a position as indicated by the right half thereof as viewed in FIG. 1 and thus the force of the spring 134 acting on the spool 130 is the smallest. The hydraulic pressure caused by this regulation by the spool 130 is supplied via the hydraulic line 110 to the port 128 to act on the accumulator piston 132, urging the accumulator piston 128 downward, as viewed in FIG. 1, agasint the action of the spring 134. Owing to the compression of the spring 134, the force which the spring 134 acts on the spool 130 gradually increases. This causes the hydraulic pressure in the hydraulic line 110 to increase gradually. Since the pressure modifier pressure is supplied to the port 124 via the hydraulic line 142, the hydraulic pressure resulting from the regulation by the spool 130 is variable also with the variation of the pressure modifier pressure. Thus, the hydraulic pressure is increased in response to the throttle pressure. Therefore, the hydraulic pressure which gradually increases with respect to elapse of time is applied to the second speed apply chamber 2A of the band brake via the hydraulic line 110. FIG. 5 shows the variation of hydraulic pressure build-up in the second speed apply chamber 2A. Referring to FIG. 5, a step of the variation of the hydraulic pressure indicated by the reference character A is caused during the displacement of the servo piston of the band brake B/B through a play, while the inclination indicated by the reference character B is caused by the displacement of the accumulator piston 132 of the 1-2 accumulator valve 80. In the manner as illustrated in FIG. 5, the hydraulic pressure in the second speed apply chamber 2A increases, causing in engagement of the band brake B/B, resulting in establishment of the second speed ratio.

Subsequently, when the 2-3 shift valve 66 is upshifted from the second speed ratio to the third speed ratio, the supply of hydraulic fluid to the hydraulic line 100 begins. The hydraulic fluid is supplied via the hydraulic line 100 to the third speed release chamber 3R of the band brake B/B and also to the high clutch H/C. Since a pressure acting area exposed to the third speed release chamber 3R is larger than a pressure acting area exposed to the second speed apply chamber 2A, the band brake B/B is released. In timed relationship with the release of the band brake B/B, the high clutch H/C is engaged, resulting in establishmewnt of the third speed ratio.

Figure 6:
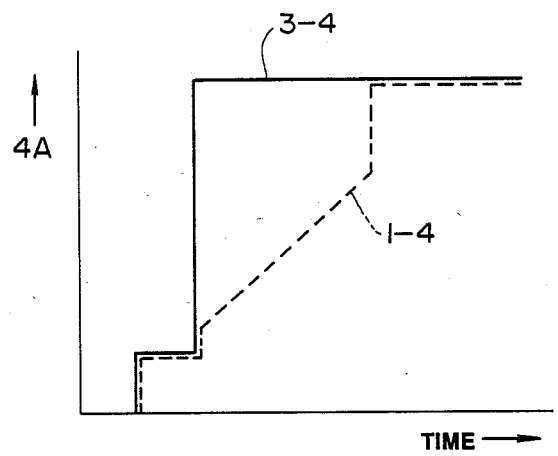

Thereafter, when the 3-4 shift valve 68 is upshifted from the third speed ratio position to the fourth speed ratio position, the supply of hydraulic fluid to the second section of the hydraulic fluid 102 begins. The hydraulic fluid flow into the first section of the hydraulic line 102 after being subject to flow restriction by the one-way flow restrictor 104. Thus, the hydraulic pressure in the first section of the hydraulic line 102 is applied to the fourth speed apply chamber 4A, causing the band brake B/B to be engaged again. During this pressure build-up, the hydraulic pressure within the first section of the hydraulic line 102 is always lower than the hydraulic pressure within the hydraulic line 110, so that there occurs no inflow of hydraulic fluid to the hydraulic line 110 from the first section of the hydraulic line 102 past the one-way valve 108. FIG. 6 shows in fully drawn line the variation of hydraulic pressure within the fourth speed apply chamber 4A during the 3-4 upshift. In this case, there is no influence of the 1-2 accumulator valve and thus the hydraulic pressure increases quickly.

Let us now consider an upshift from the first speed ratio to the fourth speed ratio (a 1-4 upshift). The 1-4 upshift is initiated by upshifting simultaneously the 1-2 shift valve 64, 2-3 shift valve 66 and 3-4 shift valve 68. As a result, simultaneous supply of hydraulic fluid to the hydraulic lines 112, 100, and 102 begins. In this case, a rise in hydraulic pressure within the third speed release chamber 3R is delayed. This delay is caused by the fact that a substantial amount of hydraulic fluid is initially required to stroke the servo piston of the high clutch H/C. On the other hand, the hydraulic fluid supplied to the hydraulic line 112 from the 1-2 shift valve 64 is regulated by the 1-2 accumulator valve 80 and thus the hydraulic pressure within the hydraulic line 110 increases in the same manner as illustrated in FIG. 5. The hydraulic pressure within the fourth speed apply chamber 4A, however, does not increase in the manner as illustrated by the fully drawn line in FIG. 6. Initially, the hydraulic pressure within the first section of the hydraulic line 102 tends to increase as illustrated by the fully drawn line in FIG. 6 and become higher than the hydraulic pressure within the hydraulic line 110 which increases as illustrated in FIG. 5. Due to this pressure differential, the one-way valve 108 is opened to allow hydraulic fluid within the first section of the hydraulic line 102 to flow into the hydraulic line 110. Thus, fluid communication between the first section of the hydraulic line 102 and the hydraulic line 110 is established. Therefore, the hydraulic pressure within the first section of the hydraulic line 102 becomes as high as the hydraulic pressure within the hydraulic line 110, and increases in the same manner as the hydraulic pressure within the hydraulic line 110 as illustrated by the broken line in FIG. 6. As a result, the torque capacity of the band brake B/B during the transition from the first speed ratio to the fourth speed ratio is considerably suppressed to a sufficiently low level, thus preventing occurrence of substantial shocks.

What is claimed is:

1. A hydraulic control system for an automatic transmission including a friction device which is engaged in response to at least one of a hydraulic pressure build-up in a low speed apply chamber and a hydraulic pressure build-up in a high speed apply chamber, the automatic transmission being shiftable to one speed ratio where hydraulic fluid is discharged from both of the low and high speed apply chambers, shiftable to another speed ratio where hydraulic fluid is supplied to the low speed apply chamber, while hydraulic fluid is discharged from the high speed apply chamber, and shiftable to still another speed ratio where hydraulic fluid is supplied to both of the low and high speed apply chambers, the hydraulic control system comprising:

means for allowing the hydraulic pressure build-up in the low speed apply chamber at a controlled gradual rate when the transmission shifts to the another speed ratio; and one-way valve means for allowing one-way flow of hydraulic fluid from the high speed apply chamber to the low speed apply chamber, whereby when the transmission shifts from the one speed ratio to the still another speed ratio, the hydraulic pressure build-up in the high speed apply chamber is controlled by said means for allowing the hydraulic pressure build-up.

2. A hydraulic control system as claimed in claim 1, including a shift valve and a hydraulic line having one end connected to said shift valve and an opposite end connected to the high speed apply chamber, and a one-way flow restrictor provided in said hydraulic line dividing said hydraulic line into a first section on the side thereof near the high speed apply chamber and a second section on the opposite side thereof, and wherein said one-way valve means is connected to said first section of the hydraulic line.

* * * * *